May 23, 1933.    W. R. ELLIS    1,910,530
CABLE SUPPORT
Filed Sept. 29, 1931
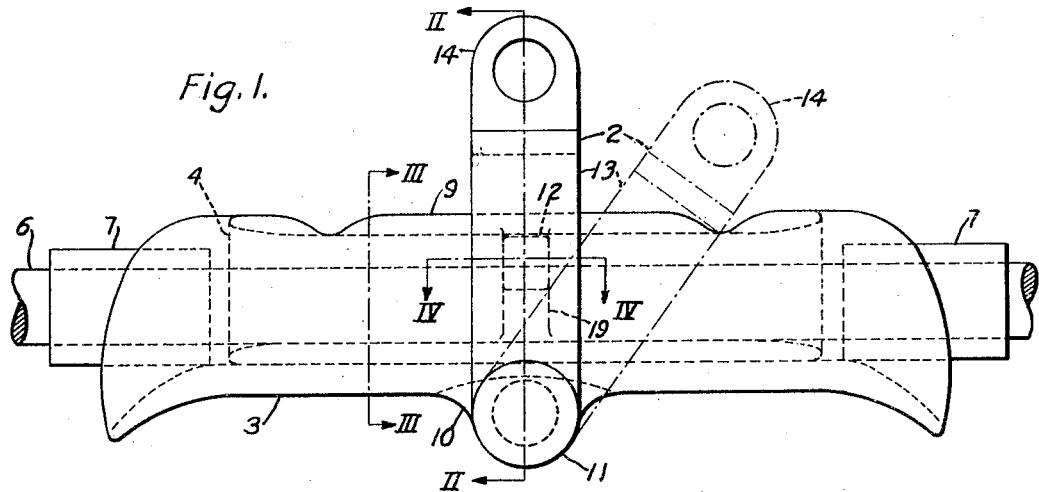
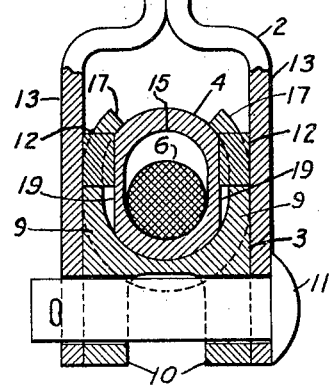 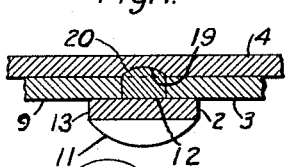 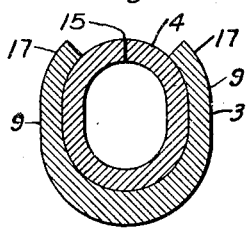
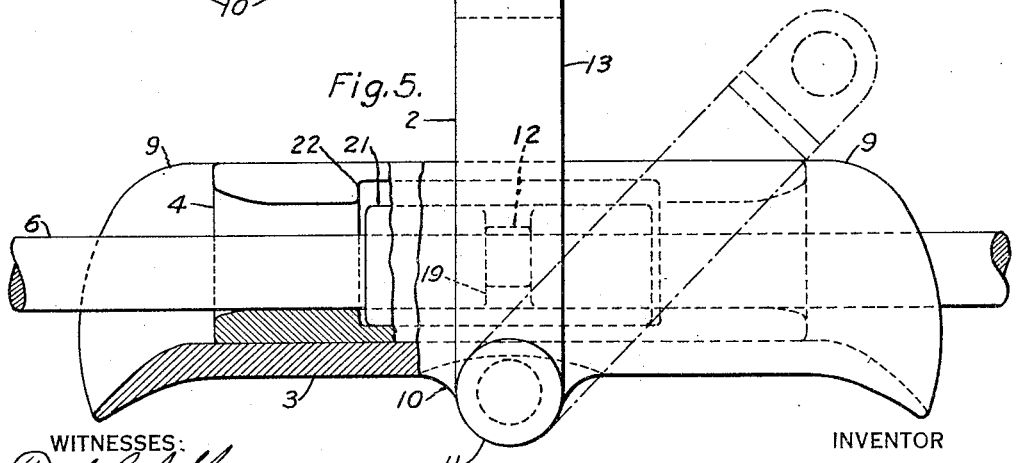
WITNESSES:
INVENTOR
Walter R. Ellis
BY
ATTORNEY Patented May 23, 1933

1,910,530

UNITED STATES PATENT OFFICE

WALTER R. ELLIS, OF WILKINSBURG, PENNSYLVANIA, ASSIGNOR TO WESTINGHOUSE ELECTRIC & MANUFACTURING COMPANY, A CORPORATION OF PENNSYLVANIA

CABLE SUPPORT

Application filed September 29, 1931. Serial No. 565,783.

My invention relates to cable supports and particularly, to means for supporting high-voltage transmission line cables.

One object of my invention is to provide lateral or vertical movement of a transmission-line cable relative to its support in response to oscillations of the cable, to normally prevent longitudinal movement of the cable relative to the support and to provide longitudinal movement of the cable relative to its support under predetermined conditions.

Another object of my invention is to provide a novel key release means for allowing a cable to slip relative to its support when the cable breaks at one side or the other of the support.

Another object of my invention is to provide an element constituting, substantially, an enlargement of the cable and that shall be held thereon under compression.

A further object of my invention is to provide a cable support that shall be simple and durable in construction, economical to manufacture, and effective in its operation.

A copending application on a cable support, Serial No. 574,242, filed November 11, 1931 by F. H. Miller and assigned to the Westinghouse Electric and Manufacturing Company, discloses a cable support of which this application is an improvement.

The copending application and the present application disclose, generally, the idea of providing a clampless support for transmission line cables wherein the cable merely rests upon its support and is not rigidly clamped thereto as in cable supports of the usual and well-known type.

The device comprises, in general, a channel member and a lateral projection or projections on the cable cooperating with the channel member for preventing longitudinal movement of the cable through the channel.

Certain forms of the support in the copending application are not particularly well adapted to permit the lateral cable projections to pass through the clamp, and it is one of my objects to provide a clamp, similar to that of the copending application, but in which the projection or projections on the cable may pass freely through the clamp.

Figure 1 of the accompanying drawing is a view in side elevation of a cable support embodying my invention.

Fig. 2 is a view taken along the line II—II of Fig. 1.

Fig. 3 is a view taken along the line III—III of Fig. 1.

Fig. 4 is a view taken along the line IV—IV of Fig. 1, and

Fig. 5 is a view, in side elevation, partially in section, of a modified form of my invention.

Referring to Figs. 1 to 4, inclusive, the device comprises, in general, a supporting element or suspension yoke 2, a cable-receiving channel 3, a sleeve 4 in the channel 3 through which a cable 6 extends, and compression elements 7 secured to the cable at opposite ends of the sleeve 4.

The channel member 3 is of a type usually employed in clamps of the rigid-clamping type having side walls 9 and a lower bearing portion 10 through which a bolt 11 extends. The side walls 9 are provided with, preferably polygonal openings for the reception of keys 12.

The supporting, or suspension, element 2, pivotally mounted on the bolt 11, preferably comprises a pair of strap-like side-arm elements 13 that embrace the sides 9 and are brought together at the upper ends thereof to provide a mounting portion 14. As thus constituted, the element 2 is substantially a yoke, the side arms 13 of which, in the normal positions thereof, as illustrated, cover the openings in which the keys 12 are located. The adjacent surfaces of the keys 12 and the arms 13 and the outer surfaces of the sides 9 are in adjacent substantially coincident parallel-plane relation.

The sleeve 4 is longitudinally split, as along the line 15 in Figs. 2 and 3; the adjacent edges of the sleeve at the split 15 initially being sufficiently spaced apart to receive the cable 6, after which the sides of the sleeve 4 are bent to the position shown. In this position, the cable is permitted substantial play in the sleeve in a vertical direction. The sides 9 of the channel 3 are bent over at portions 17 to prevent lateral or vertical movement of the sleeve 4 in the channel. The portions 17 may be initially provided, as shown, and the sleeve 4 placed thereof longitudinally from the ends of the channel 3 or the portions 17 may initially be straight and bent to the position shown, after the sleeve 4 has been placed therein.

As shown more clearly in Figs. 2 and 4, the sleeve 4 has vertical keyways 19 in its side walls having surfaces 20 curved in a horizontal plane.

The compression members 7 are preferably in the form of longitudinally-split collars, in order that they may initially be placed around the cable 6 and secured tightly thereto under substantial compression. Although the members 7 are comparatively rigid and rigidly held to the cable 6, they are not secured to any other part of the support and merely float with the cable, in response to oscillations thereof, so that little or no fatigue occurs in the cable opposite the collars. The members 7 are of substantially greater external diameter than the interior diameter of the sleeve 4, and, consequently, cannot move therethrough. Since the sleeve 4 is held by the keys 12 in the channel member 3 and the members 7 are held by the cable 6, adjacent to the ends of the sleeve 4, the cable is held in substantial floating position from which it cannot move materially in the direction of the cable.

Under ordinary conditions, oscillations of the cable move the channel member about the bolt 11 as a pivot but by an amount insufficient to permit the yoke 2 to uncover the outer ends of the keys 12. Since the cable is not rigidly clamped in the support, there are no definitely located fatigue points, as there are in cables of the rigid clamping type adjacent to the ends thereof. Violent oscillations of the cable, however, such as caused by the sudden release of quantities of ice on the cable, cause the cable to move laterally from its support through a distance determined by the diameter of the sleeve 4.

When the cable breaks at one side or the other of the support, the increased tension of the structure at one side thereof causes the yoke 2 to move relative to the channel member 3 to a position, as indicated by broken lines in Fig. 1. In the latter position, the outer ends of the keys 12 are uncovered by the sides of the yoke 2 and, since the inner ends of the keys 12 and surfaces 19 in the sleeve 4, against which the inner ends of the keys normally abut, are curved in a direction parallel to the cable, the surfaces 20 act as cams to move the keys away from the sleeve 4 to release the sleeve. Thus, the sleeve 4 and one of the compression elements 7 will pass freely through the channel member 3.

In the form of my invention shown in Fig. 5, in which corresponding parts are designated by corresponding reference characters, instead of two of the compression elements 7 there is but one compression element 21 disposed on the cable near the center of the support in a recess 22 of the sleeve 4. This construction, otherwise the same, as in the structure of the previous figures, allows the cable 6 free play at its ends and also prevents its longitudinal movement relative to the sleeve and the channel member.

While I have shown and described particular forms of my invention, changes may be effected therein without departing from the spirit and scope thereof as set forth in the appended claims.

I claim as my invention:

1. A cable support comprising a supporting element, a cable receiving member supported by the element, means for holding a cable relative to the cable-receiving member including a sleeve through which the cable extends and means held to the cable preventing longitudinal movement of the cable through the sleeve, and means normally holding the sleeve in position relative to the receiving member and releasing the same in response to movement between the element and the receiving member.

2. A cable support comprising a supporting element, a cable-receiving member supported by the element, means for holding a cable relative to the cable-receiving member, including sleeve portions through which the cable extends, the sleeve portion having a normal bore of substantially greater radii than the radius of the cable and providing an internal recess laterally of said bore, a member secured to the cable in said recess preventing longitudinal movement of the cable in the sleeve, and means normally holding the sleeve in position in the cable-receiving member and releasing the same in response to movement between the element and the receiving member.

3. A cable support comprising a cable receiving member having an opening through a wall thereof, a supporting element pivoted to said member to normally cover but to clear said opening, a cable-positioning member in said receiving member and a key in said opening holding said cable-positioning member to the receiving member when the supporting element covers said opening and releasing the cable-positioning member when the supporting element clears the opening.

4. A cable support comprising a member having through openings, a suspension yoke pivotally connected to said member and normally covering, but movable aside the openings, a cable-receiving member in said first member having keyway portions opposite said openings, means preventing movement of the cable relative to the receiving member, and keys in said openings and keyway portions normally held by the yoke to hold the receiving member, said keyway portions being shaped to move the keys therefrom by relative movement of said members when the yoke clears the openings.

5. A cable support comprising means supporting a cable between spaces providing substantially free movement of the cable laterally off said means in response to oscillations of the cable, means limiting said movement including a longitudinally-split sleeve swedged in position about the cable and means preventing movement of the cable relative to the support in the direction of the cable including a single integral member held to the cable under compression.

In testimony whereof, I have hereunto subscribed my name this 24th day of September 1931.

WALTER R. ELLIS.